Figure 1:
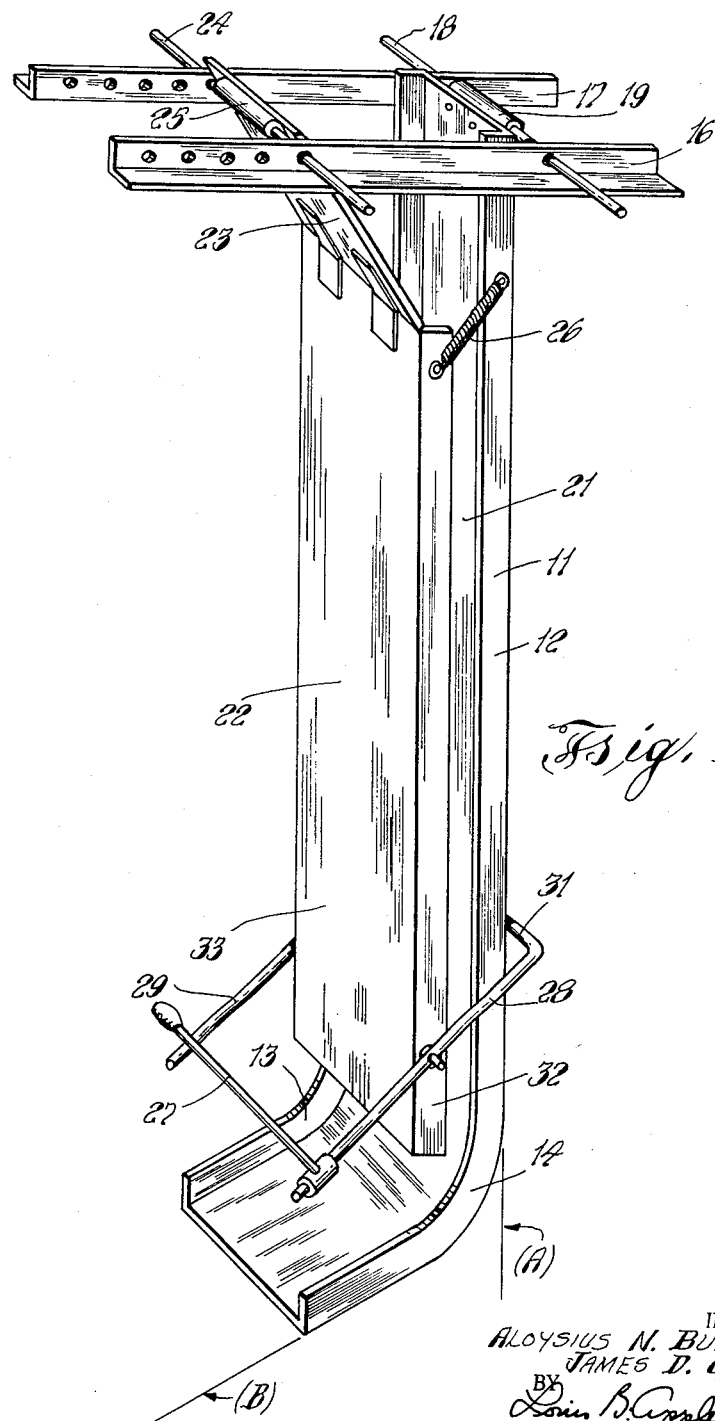

Nov. 24, 1964 A. N. BUDJINSKI ETAL 3,158,245
GRAVITY CONVEYORS

Filed Nov. 19, 1962 5 Sheets-Sheet 1

INVENTORS.
ALOYSIUS N. BUDJINSKI
JAMES D. GEORGIA
BY
Louis B. Applebaum
Edward F. Costigan
ATTORNEYS

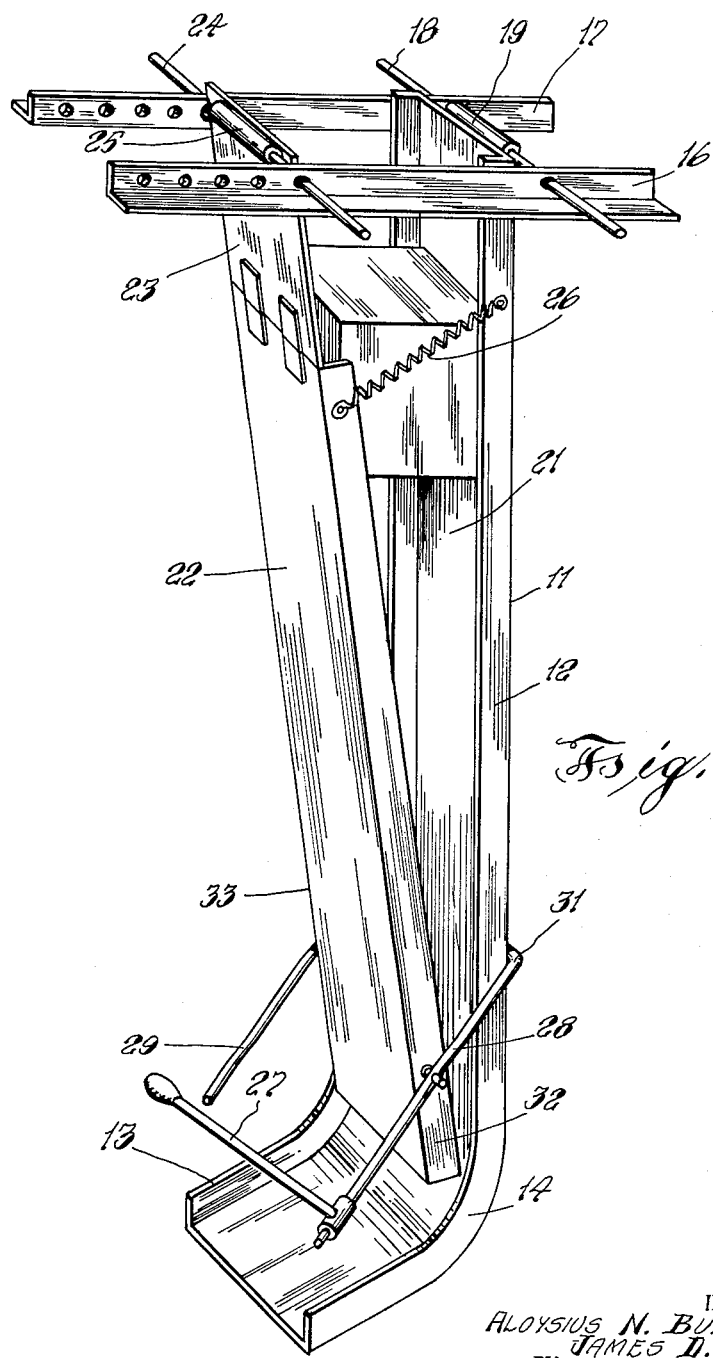

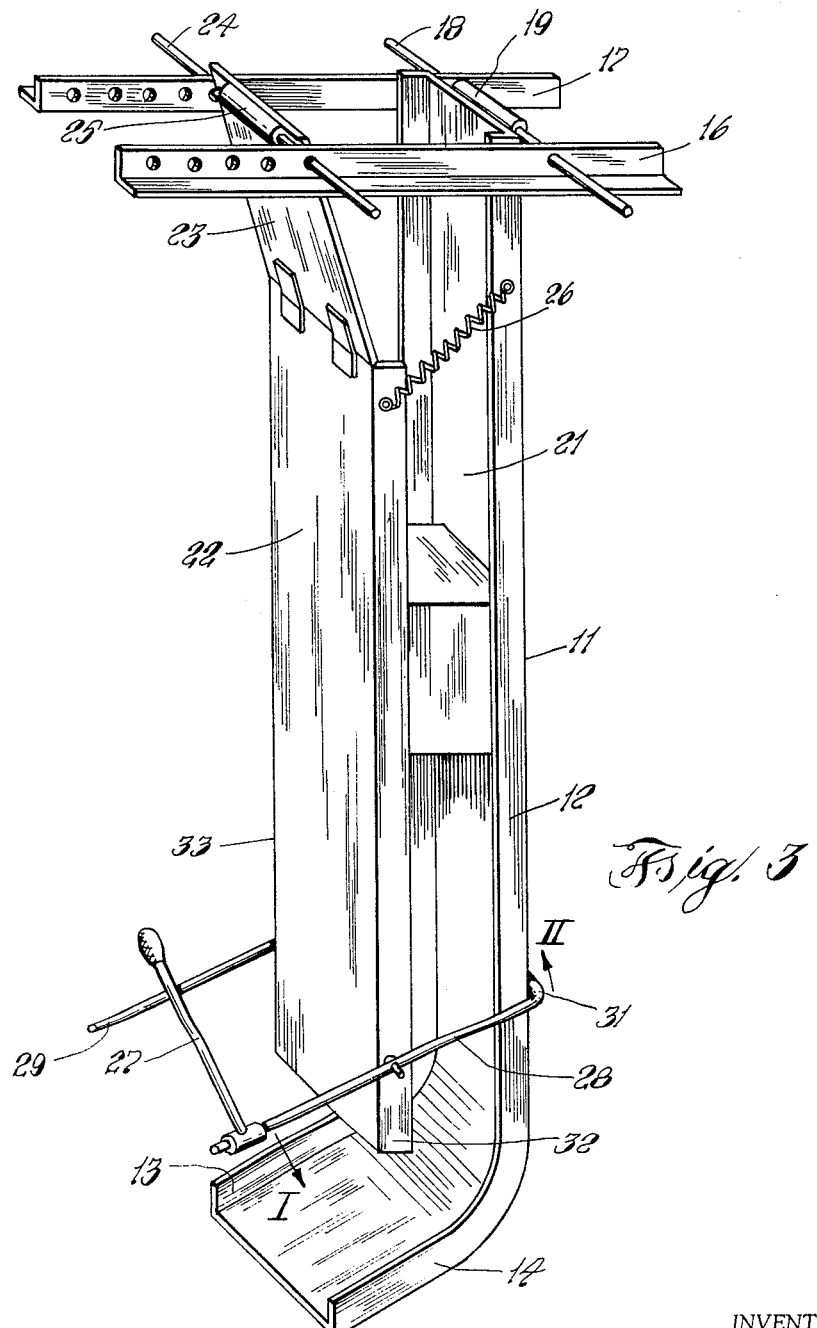

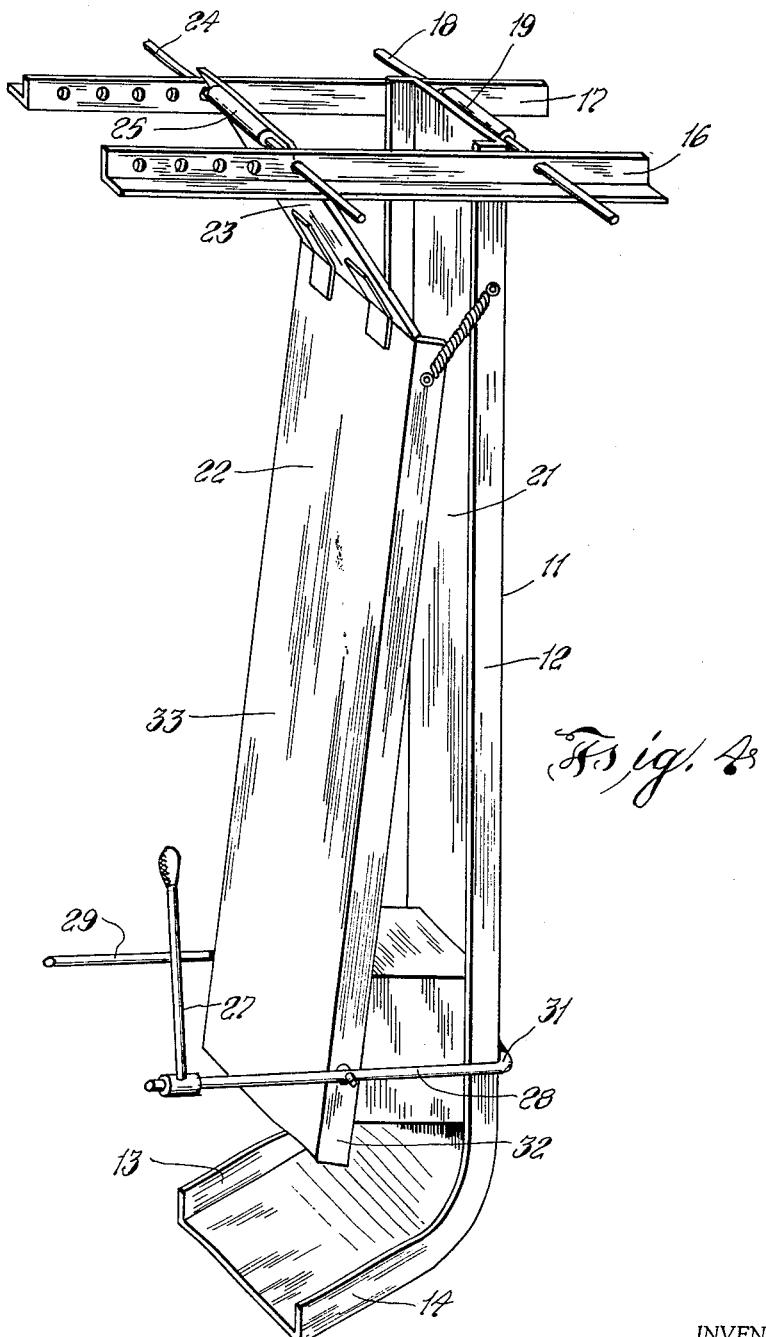

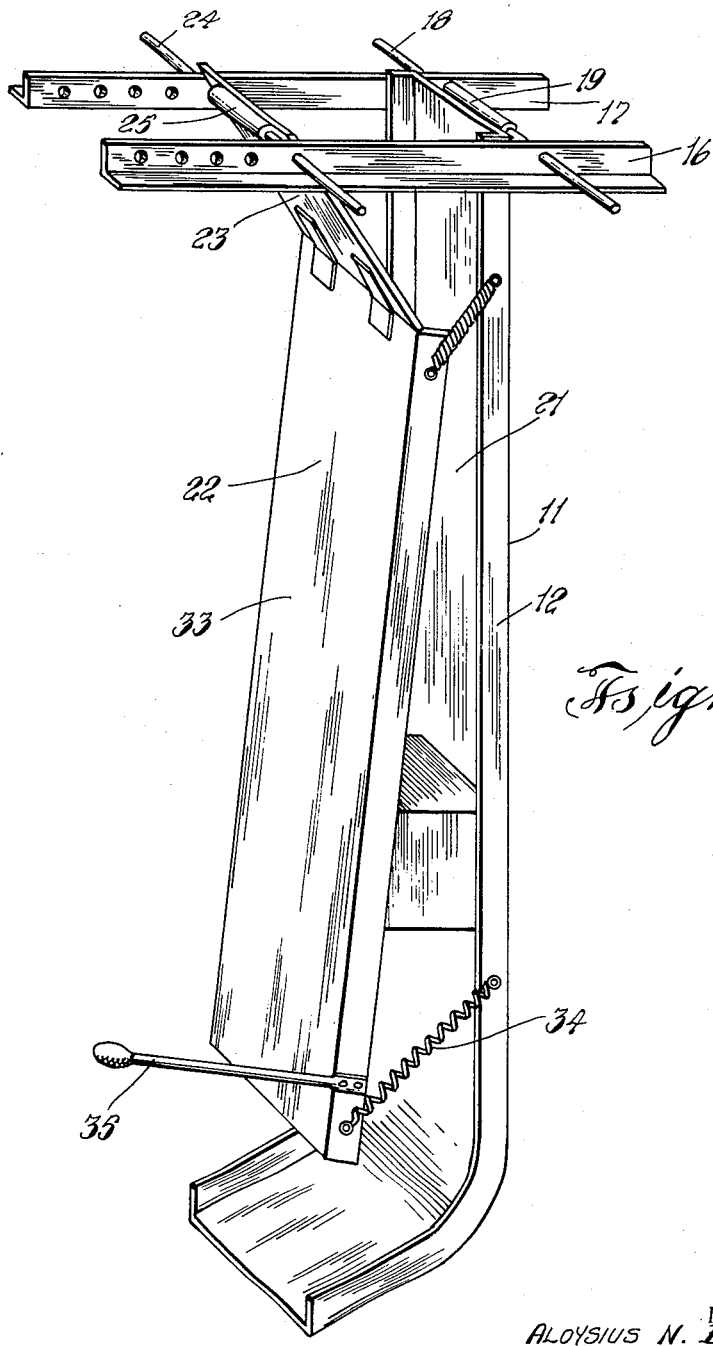

United States Patent Office 3,158,245
Patented Nov. 24, 1964

3,158,245
GRAVITY CONVEYORS
Aloysius N. Budjinski, 405 Bartlett St., Roselle, N.J., and James D. Georgia, 143 Ege Ave., Jersey City, N.J.
Filed Nov. 19, 1962, Ser. No. 238,814
2 Claims. (Cl. 193—32)
(Granted under Title 35, U.S. Code (1952), sec. 266)

The invention described herein may be manufactured and used by or for the Government of the United States of America for governmental purposes without the payment of any royalties thereon or therefor.

This invention relates to improvements in conveying apparatus and particularly to gravity conveyors of improved construction for use in the substantially vertical transfer of bulk articles from a delivery station to a discharge station. This invention is a continuation-in-part of application Serial Number 216,709 filed August 10, 1962.

The problem of cargo transfer, handling and storage aboard ship is of particular interest to the Navy. One phase of the problem, the vertical transfer of bulk cargo such as packages, boxes, and the like, from one deck to another deck that is at a lower level, has a significant impact upon operations.

In the past, the packages desired to be transferred were merely placed on a trough-like chute and allowed to freely progress down the length of the chute to the discharge station by gravitational forces. However, as the packages descended down the conveyor, they increased in acceleration and were usually traveling at a high speed upon arrival at the discharge station. In order to properly handle the packages, it was necessary to bring them to an abrupt halt. This was usually accomplished by allowing the speeding packages to come in headlong contact with a bulkhead, but, in many cases, the individual articles within the packages were damaged as a result of this treatment. As an alternative, attempts were made to bodily catch the individual packages in their flight down the chute but this was found to be physically dangerous to the operating personnel. Another approach was to provide the chute with an abrasive friction surface in an attempt to slow down the flight of the packages. However, this was found to be damaging to the outer protective covering of the package, and otherwise unsatisfactory.

We have invented a gravity conveyor of improved construction which can be used to vertically transfer cargo from an upper level to a lower elevel without incurring damage to the cargo. The disadvantages heretofore encountered in the vertical transfer of cargo are substantially overcome by the present invention. It has been found that by controlling the speed of the vertically descending packages, the initial impact of the package upon arrival at the discharge station can be dramatically reduced, thus lessening the liability of the package to damage.

In general, the subject invention provides a gravity conveyor having an overhead spring actuated package retarding means for control of the speed of descending cargo such as packages, boxes and the like.

The principal object of the present invention is to provide a gravity conveyor of improved construction for use in the substantially vertical transfer of cargo from a supply station to a receiving station.

Another object is to provide a gravity conveyor of improved construction for use in the substantially vertical transfer of cargo aboard ship from a supply station to a receiving station.

A further object is to provide a gravity conveyor of improved construction of low fabrication and maintenance costs, high durability and facile in use under a wide variety of service conditions.

Other objects and many of the attendant advantages of this invention will be readily appreciated as the same becomes better understood by reference to the following detailed description when considered in connection with the accompanying drawings wherein:

FIG. 1 is a perspective view of a gravity conveyor, showing a preferred embodiment of the present invention;
FIG. 2 is a view showing the entrance of a package to the chute of the conveyor shown in FIG. 1;
FIG. 3 is another view showing the descent of the package down the chute of the conveyor;
FIG. 4 is a further view showing the package at the exit end of the chute; and
FIG. 5 is a perspective view of a further embodiment of this invention.

Similar numerals refer to similar parts throughout the several views.

Referring to FIG. 1, the gravity-conveyor is provided with an elongated, flat, trough-like frame section 11 having upturned sidewalls 12, 13 in the form of a chute, the lower portion 14 of which extends in an outwardly direction. The upper portion of the chute 11 is secured in position between support member 16, 17 on transverse-bar 18, which passes through tube 19 secured to the rear of the upper portion of the chute 11 so that the width of the bed 21 of the chute is transversely disposed between the two support members 16 and 17.

The bed 21 of the chute is provided with an overhead pressure-shoe 22 in the form of an inverted trough-like frame construction having dimensions similar to that of the chute. Alternatively, the pressure-shoe may be a flat, elongated section of smaller width than that of the chute 11. The upper extremital end of the pressure-shoe 22 is operatively connected in hinged relationship to the lower extremital end of receiving-section 23, the upper portion of which is pivotally mounted between support member 16, 17 in spaced relationship to the chute 11 on transverse-bar 24 passing through tube 25 secured to the rear of the upper portion of the receiving-section 23. The shoe 22 is connected to the receiver-section 23 in such a manner that the width of the shoe is aligned at a predetermined distance above the bed 21 of the chute.

The upper portion of the pressure-shoe 22 is provided with a spring-type tensioning means 26 which functions to force the upper portion of the pressure-shoe 22 towards the upper portion of the chute 11. The movement of the lower portion of the shoe 22 with respect to the bed of the chute is controlled by a manually-operated arm 27 journalled on the end portion of lever arm 28 of U-shaped shaft 31. The body portion or base of shaft 31 passes beneath the bed of the chute 11 in the manner set forth in FIG. 1 and the arms 28 and 29 extend on either side of the chute 11 and the shoe 22. The central portion of each of the arms 28 and 29 is pivotally mounted on the sides 32 and 33 of the pressure-shoe 22.

In utilizing this invention, a package is placed on chute 11 between supports 16, 17 and allowed to drop into the space bounded by the receiving-section 23 and the upper portion of the chute 11. As the package progresses downwardly, it encounters the receiving-section 23 which is then forced to pivot outwardly on transverse-bar 24 by the weight of the package. The outward movement of the lower portion of the receiving-section 23 forces the upper extremital end of the pressure-shoe 22 to move away from the bed of the chute 11 against the restraining action of the spring 26, which attempts to maintain the shoe 22 in proximity to the bed of the chute 11, and the package progresses downwardly into the space bounded by the upper portions of the shoe 22 and the chute 11 as shown in FIG. 2. At this point, the restraining action of the spring 26, maintains the shoe 22 in contact with the upper surface of the package and functions to slow the speed of the package.

As the package progresses down the length of the chute 11 by gravitational force, it encounters the snubbing action of the shoe which is held in proximity to the bed of the chute through the use of manually-operated arm 27. The force exerted by the descending package pushes the shoe 22 in an outwardly direction and, as a result, each of the individual springs 26, is expanded and a compensating inward pressure is exerted on the descending package. The speed of the descending package may be reduced to a minimum or the package may be actually stopped in descent depending on the pressure of the shoe, and the latter pressure may be regulated by the manually operated arm 27 and through the use of tension springs 26, of variable strength.

As long as the pressure due to the weight of the descending package is greater than the pressure exerted by the shoe 22, the package will continue to descend farther down the length of the chute 11. The pressure exerted by the shoe may be increased through the use of the manually-operated arm 27 because the shoe 22 functions as an overall lever and the descending package functions as a movable fulcrum. As the arm 27 is moved in a downwardly direction, a force I is exerted against the outer surface of the lower portion of the shoe 22 by lever arm 28 and a force II is exerted by the body portion of U-shaped shaft 31 against the rear of the lower portion of the chute as shown in FIG. 3. This results in the movement of the lower portion of the shoe 22 towards the lower portion of the bed of the chute 11 and because of the fulcruming action of the package, the movement of the upper portion of the shoe 22 away from the upper portion of the bed of the chute 11 and the expansion of springs 26. The more each of the springs 26, is expanded by this action, the greater is the inward pressure exerted by the shoe 22 on the descending package. It is possible to retard the speed of various size packages or the prackages may be stopped in transit through the use of tension springs of variable strength. The spring-tensioning means are easily interchanged and the apparatus is quickly adaptable to precise control over a wide range of load conditions.

If the downward pressure on the manually-operated arm 27 is lessened, the forces exerted on the lower portions of the shoe 22 and the chute will diminish and the lower portion of the shoe 22 will be forced away from the bed 21 of the chute 11 by the weight of the package as shown in FIG. 4 and the package may now progress at a fairly safe speed along the remaining length of the chute. However, if it is still desired to stop the package in flight, this may be accomplished by applying a downward force to arm 27 before the package is free of the shoe 22. The lower end portion of the chute 11 extends in an upwardly direction to facilitate transit of packages from the chute 11 to a receiving conveyor or discharge station.

When the structure is in operative position, as shown in FIGS. 1 to 4, the receiving-section 23 and the chute 11 are mounted between the supports 16 and 17 in the manner set forth. When the structure is not in use, however, the apparatus may be easily disassembled by pushing or pulling bars 18 and 24, which support the chute 11 and receiving-section 23, out of engagement with the support members 16 and 17. In this manner, the apparatus may be disassembled and either stored or conveniently carried to another location where it may be easily assembled for use.

In FIG. 5, a further embodiment is set forth in which the lower portion of the apparatus is provided with a manually operated braking system in cooperation with a spring-type tensioning means. As the package descends on the frame 11 to a position in proximity to the tensioning means 34, the latter elements become activated as shown. The force exerted by the descending package pushes the shoe 22 in an outwardly direction and, as a result, each of the individual springs 34 are expanded and a compensating inward pressure is exerted by the shoe 22 on the descending package. The more each of the springs 34 is expanded by the action of the descending package, the greater is the inward pressure exerted by the shoe 22 on the descending package.

The speed of the descending package may be reduced to a minimum or the package may be actually stopped in transit depending on the pressure of the shoe 22 and the latter pressure may be regulated through the use of tensioning springs 34 of variable strength. As long as the pressure due to the weight of the package is greater than the pressure exerted by the shoe 22, the package will continue to descend down the length of the chute 11. It is possible, however, to retard the speed of various size packages through the use of tension-springs 34 of variable strength. These spring-tensioning means are easily interchanged and the apparatus is quickly adaptable to precise control over a wide range of load conditions. In any case, however, the package may be stopped in transit through the use of manually-operated arm 35 which may be used to increase the inward pressure of the shoe on the descending package.

Each of the apparatus, as described, may be used as a single unit to retard the speed of descending packages or several units may be placed in series in order to apply a series of snubbing actions and to increase the overall length of the operating chute.

Obviously, many modifications and variations of the present invention are possible in the light of the above teachings. For instance, the present invention has been described with particular reference to the vertical transfer of cargo from one deck to another aboard ship. However, it is to be understood that use is not limited to cargo transfer aboard ship, but that the invention has salutary advantages when employed in a use where either or both of the supply and receiving stations are shore stations. It is therefore to be understood that within the scope of the appended claims, the invention may be practiced otherwise than as specifically described.

We claim:

1. A gravity conveyor comprising, in combination, dual aligned frame members;
a chute having a bed;
    the upper portion of said chute being transversely mounted between said frame members;
a receiving-section,
    the upper portion of which is pivotally mounted between said frame members at a predetermined distance from the bed of said chute;
a pressure-shoe overhead the bed of said chute,
    the upper portion of said shoe operatively connected to the lower end of said receiving-section;
spring-tensioning means mounted between the upper portion of said shoe and the upper portion of said chute;
dual levers,
    each of which is pivotally mounted on an opposite side of the lower portion of said shoe,
        one end of each of said levers extending below the bed of said chute and the other end of each of said levers extending above the top surface of said shoe;
a rigid member extending between the ends of each of said levers that extend below the bed of said chute; and
means of applying a downward pressure to the portion of said lever that extends above the top surface of said shoe and a corresponding upward pressure to said rigid member.

2. A gravity conveyor comprising, in combination, dual aligned frame members;
a chute, the upper portion of which is transversely mounted between said frame members;

a receiving-section,
the upper portion of which is pivotally mounted between said frame members at a predetermined distance from the bed of said chute;

a pressure-shoe overhead the bed of said chute,
the upper portion of said shoe operatively connected to the lower end of said receiving-section;

a plurality of spring-tensioning means mounted between the upper portion of said shoe and the upper portion of said chute;

a second plurality of spring-tensioning means mounted between the lower portion of said shoe and the lower portion of said chute; and an arm mounted on the side of said shoe for the application of a downward pressure to said shoe.

References Cited in the file of this patent
UNITED STATES PATENTS

| | | |
|---|---|---|
| 2,124,964 | Klyver | July 26, 1938 |
| 2,588,142 | McQueen | Mar. 4, 1952 |
| 2,924,162 | Tuncq | Feb. 16, 1960 |